United States Patent [19]
Chauhan

[11] Patent Number: 6,115,752
[45] Date of Patent: *Sep. 5, 2000

[54] SYSTEM AND METHOD FOR SERVER SELECTION FOR MIRRORED SITES

[75] Inventor: Abhishek Chauhan, Palo Alto, Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/083,864

[22] Filed: May 21, 1998

[51] Int. Cl.[7] .................................................. G06F 15/173

[52] U.S. Cl. ........................................... 709/241; 709/238

[58] Field of Search .......................... 709/238, 241–242, 709/244

[56] References Cited

U.S. PATENT DOCUMENTS

| | | | |
|---|---|---|---|
| 5,341,477 | 8/1994 | Pitkin et al. | 709/226 |
| 5,721,904 | 2/1998 | Ito et al. | 707/8 |
| 5,740,371 | 4/1998 | Wallis | 709/229 |
| 5,751,961 | 5/1998 | Smyk | 709/217 |
| 5,774,660 | 6/1998 | Brendel et al. | 709/201 |
| 5,862,348 | 1/1999 | Pedersen | 709/229 |
| 5,867,706 | 2/1999 | Martin et al. | 709/105 |
| 5,894,554 | 4/1999 | Lowery et al. | 709/203 |
| 5,933,596 | 8/1999 | Mayhew | 709/203 |
| 5,933,606 | 8/1999 | Mayhew | 709/239 |
| 5,938,732 | 8/1999 | Lim | 709/229 |
| 5,944,793 | 8/1999 | Islam et al. | 709/220 |
| 5,951,694 | 9/1999 | Choquier et al. | 714/15 |
| 5,999,525 | 12/1999 | Krishnaswamy et al. | 370/352 |
| 6,003,030 | 12/1999 | Kenner et al. | 707/10 |
| 6,014,698 | 1/2000 | Griffiths | 709/224 |

FOREIGN PATENT DOCUMENTS

| | | |
|---|---|---|
| 0648038A2 | 12/1995 | European Pat. Off. . |
| WO 98/18076 | 4/1998 | WIPO . |
| WO 98/31107 | 7/1998 | WIPO . |

OTHER PUBLICATIONS

Katz, E., et al., "A Scalable HTTP Server: The NCSA Prototype," Comp. Networks & ISDN Systems, vol. 27, No. 2, pp. 155–164, Nov. 1994.

Baentsch, M., et al., "Introducing Application–Level Replication and Naming Into Today's Web," Comp. Networks & ISDN Systems, vol. 28, No. 11, pp. 921–930, May 1996.

Billard, E., "Load Balancing to Adjust for Proximity in Some Network Topologies," Comp. Networks & ISDN Systems, vol. 22, No. 14, pp. 2007–2023, Mar. 1997.

(List continued on next page.)

Primary Examiner—Zarni Maung
Assistant Examiner—Andrew Caldwell
Attorney, Agent, or Firm—Beyer Weaver & Thomas, LLP

[57] ABSTRACT

The present invention is a system and method for providing server selection for mirrored sites. In one embodiment, a user requests an address via a local name service (LNS), and the local name service requests the address from a server, examples of which include an authoritative name server, and a Optimizer Name Server (ONS). If the ONS has already calculated a best route which applies to this user, and a predetermined time applying to the best route has not yet expired, then the ONS replies to the user with the best route server. In one embodiment, the best route is determined by having the ONS server request from all the mirrored servers the round trip time to the LNS. This is accomplished by having each mirrored server respond to the LNS with a name query. In response, the LNS replies with an error message. The round trip time is measured from the time the name query was sent to the time the error message was received. Each mirrored server then sends the measured round trip time to the ONS. If, however, the best route has not been determined or the predetermined time for the best route has expired, then the ONS replies to the user via a selection scheme, such as a round robin scheme, and also initiates a best route determination to determine which is the best route for this user.

16 Claims, 7 Drawing Sheets

OTHER PUBLICATIONS

Damani, O., et al., "One–IP: Techniques for Hosting a Service on a Cluster of Machines," Comp. Networks & ISDN Systems, vol. 29, Nos. 8–13, pp. 1019–1027, Sep. 1997.

Colajanni M. et al., "Adaptive TTL schemes for Load Balancing of Distributed Web Servers", Performance Evaluation Review, vol. 25, No. 2, Sep. 01, 1997 pp. 36–42, XP000199853, ISSN: 0163–5999.

Bhattacharjee S. et al., "Application–Layer Anycasting", Proceedings of the IEEE Infocom '97, the Conference on Computer Communications. 16$^{th}$ Annual Joint Conference of the IEEE Computer and Communications Societies. Driving the Information Revolution, Kobe, Apr.7–12, 1997, vol. 3, pp. 1388–1396, XP002109465, IEEE, ISBN: 0–8186–7782–1.

Colajanni M. et al., "Scheduling Algorithms for Distributed Web Servers", Proceedings of the 17$^{th}$ International Conference on Distributed Computing Systems, Baltimore MD., May 27–30, 1997, pp. 169–176, XP000793033, IEEE, ISBN: 0–8186–7814–3.

SYSTEM AND METHOD FOR SERVER SELECTION FOR MIRRORED SITES

BACKGROUND OF THE INVENTION

1. Field of the Invention

The present invention relates to accessing data on the Internet via a computer system. In particular, the present invention relates to a system and method for selecting a server for requested data.

2. Description of the Related Art

With the growing popularity of the Internet, providing speedy access to a requested location on the Internet is fast becoming a major issue. When a popular web page is hosted by a single computer, the Internet traffic to the computer can be overwhelming. To solve this problem, several computers can be utilized to host the web page such that each hosting computer, typically referred to as a server, contains a copy of the web page. If there are many servers at the same location, then the network connection to that location can become choked during a time of high Internet traffic. To avoid choking the network connection, mirrored servers can be located at different sites. These sites are herein referred to as mirrored sites. The use of multiple computers to host a web page is typically referred to as mirroring servers.

FIGS. 1 and 2 illustrate basic communication lines in the Internet. FIG. 1 is a diagram showing the basic organization of the Internet. Groups of networks 100A–100C, 100D–100F, and 100G–100I, are shown to be connected via routers 102A–102F. A set of networks and routers combine to create an autonomous system (AS). A collection of networks within an AS can consistently perform various tasks with standards and protocols within the AS 104A–104C. Each AS 104A–104C is shown to be coupled with another AS via a gateway 106A–106B. Gateways 106A–106B typically contain enough information about the Internet such that each gateway has data related to every other gateway. Each gateway typically has routing tables which contains information relating to a route from point A to point B for the entire Internet.

FIG. 2 is a block diagram illustrating a path taken by a user's request for a particular address, and the path taken in receiving that address. FIG. 2 shows user 200 requesting an address, such as www.sun.com, from a local name service 201. The user's local name service 201 may be a service such as Netcom or AT&T. The local name service 201 then requests the address for sun.com from a domain name service (DNS) server 202a. Typically, the DNS server 202a requests the address for sun.com from another DNS server 202d, which in turn will typically request another DNS server 202c. This series of requests continues until the request for the address of sun.com arrives at an authoritative name service (Authoritative NS) 204. The authoritative NS 204 can determine the address of sun.com. In the example shown in FIG. 2, mirrored servers IP12 06a, IP2 206b, and IP3 206c are shown to be utilized. The authoritative NS 204 determines which server 206a–206c address to respond to the request for an address such as sun.com. The mirrored servers 206a–206c can be located in various geographically diverse locations such as an east location, west location, and an European location. An advantage of having mirrored servers located at various locations is that multiple locations can accommodate more Internet traffic than a single location. A further advantage of having mirrored servers in various locations is that if the user is located in Europe, accessing the European server 206c is most likely faster than the European user accessing the west coast server 206c.

The authoritative NS 204 can select a mirrored server based on several factors. These factors include the load on each server or the user's location. Ideally, the requested address should be returned to the user very quickly and download into the user's computer system as quickly as possible. The time between the request being sent out and the address being received is referred to latency. The time it takes to download the requested data is typically determined by the bandwidth.

Once the authoritative NS 204 determines which mirrored server the user should access, the authoritative NS 204 returns the address of the selected mirrored server back to the user via the route taken by the user's request.

A problem arises when a user bookmarks a particular web page. When a user bookmarks a particular web page, the user is typically bookmarking a particular server. For instance, if a user in California is sent to the European server 206c, and the user bookmarks the page, then when the user recalls the page from a bookmark, then the user will return to the European server 206c. However, the second time the user accesses the European server 206c, the European server may be heavily loaded, while the eastern server 206a may have a light load. In that situation, it may be better for the user to access the eastern server 206a rather than the European server 206c. Since the user has bookmarked a particular server, whatever scheme was instituted in the authoritative NS 204 is typically defeated. Additionally, if the user has bookmarked a particular server, it is better for the user if the bookmarked server can be accessed quickly. For instance, the user in California may be in a more optimal situation if the bookmarked server was located closer to the user than the European server 206c. These potential problems related to bookmarking typically occur in Http redirect mechanisms which are not transparent to the user.

The address given by the authoritative NS 204 is typically valid for a predetermined limited amount of time. If the user requests access to the same web page which the user had previously requested, the user should ask the authoritative NS 204 again for the address of the web page if the previous amount of time has expired since the last request. In this manner, the authoritative NS 204 can reevaluate the situation and redetermine which server to route the user.

Several schemes for determining which of the mirrored servers to use has been utilized by various authoritative NS's 204. One such scheme is a load balancing named (LB named) system scheme. In this scheme, the authoritative NS 204 determines how many users are being served by each mirrored server and routes a new user to the mirrored server with the least load. The load is determined by the number of people accessing the server at a given time and the power of the server. The problem with the LB-named scheme is that although it factors load balancing, the scheme is indifferent to the location of the user. The location of the user is typically a factor in determining latency. If the user is very far from the assigned server, then it will typically take longer to access the far server than if the user was very close to the server, even if the closer server's load is heavier than the farther server's load.

Another scheme which is conventionally used by the authoritative NS 204 is the round robin DNS. The round robin DNS simply takes turns on which server is to be used. The problem with the round robin DNS scheme is that it does not take into consideration the various loads of the mirrored servers at any given time. Additionally, the round robin DNS scheme also fails to take into consideration the location of the user. Accordingly, the two factors of latency and bandwidth are not typically considered in the round robin scheme.

Yet another scheme can be referred to as an AS hop count scheme. In the AS hop count scheme, autonomous systems located between the user and a mirrored server are counted and the server with the smallest number of autonomous systems located between the user and the server is selected for use by that user. The AS hop count scheme assumes that the factors of bandwidth and latency are approximately reflected in the number of autonomous systems located between the user and a server. However, in practice, autonomous systems can be various sizes and a small autonomous systems typically cannot accommodate as much traffic as a large autonomous system. Accordingly, a route including a larger number of autonomous systems may actually be faster than a route with a smaller number of autonomous systems if a very small As is included in the route with the smaller number of autonomous systems.

What is needed is a system and method for a server selection for mirrored sites which optimizes access and is transparent to the user. The present invention addresses such a need.

SUMMARY OF THE INVENTION

The present invention is a system and method for providing server selection for mirrored sites. In a preferred embodiment, a user requests an address via a local name service, and the local name service requests the address from a server, examples of which include an authoritative name server, and an Optimizer Name Server (ONS). If the ONS has already calculated a best route which applies to this user, and a predetermined time applying to the best route has not yet expired, then the ONS replies to the user with the best route server. If, however, the best route has not been determined or the predetermined time for the best route has expired, then the ONS replies to the user via a selection scheme, such as a round robin scheme, and also initiates a best route determination to determine which is the best route for this user.

In the preferred embodiment, the best route determination begins with requesting all the mirrored servers for a round trip time to the requesting local name server used by the user. Each mirrored server then sends a name query to the local name server (LNS). The LNS then would reply with an error message stating that no such name exists. Each mirrored server then determines its own round trip time for the name query and the error message and sends the round trip time to the ONS. The ONS receives the round trip times of all mirrored servers and determines which mirrored server has the shortest round trip time (best route). The best route determination is then stored for a predetermined time. If the same LNS requests an address from the ONS within that predetermined time, then the mirrored server with the best route for that particular LNS is utilized.

Alternatively, rather than each mirrored server sending a name query to the LNS, each mirrored server sends an Internet control message protocol (ICMP) echo packet to the LNS. When the echo packet is returned from the LNS, then a round trip time can be determined by each mirrored server.

A method according to an embodiment of the present invention for computer server selection in a computer network including a plurality of servers is presented. The method comprising determining whether a best route has been determined; selecting one of the plurality of servers as a best route server if the best route has been determined; and selecting one of the plurality of servers as a selection scheme server scheme if the best route has not been determined. The selection of the selection scheme server is determined via a selection scheme, wherein the selection scheme does not include determining the best route.

A system according to an embodiment of the present invention for computer server selection in a computer network is also presented. The system comprises a plurality of servers; and an authoritative name server coupled to the plurality of servers. The authoritative name server determines whether a best route has been determined. It selects one of the plurality of servers as a best route server if the best route has been determined, and selects one of the plurality of servers as a selection scheme server if the best route has not been determined. The selection scheme does not include determining the best route.

DETAILED DESCRIPTION OF THE PREFERRED EMBODIMENTS

The following description is presented to enable one of ordinary skill in the art to make and to use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
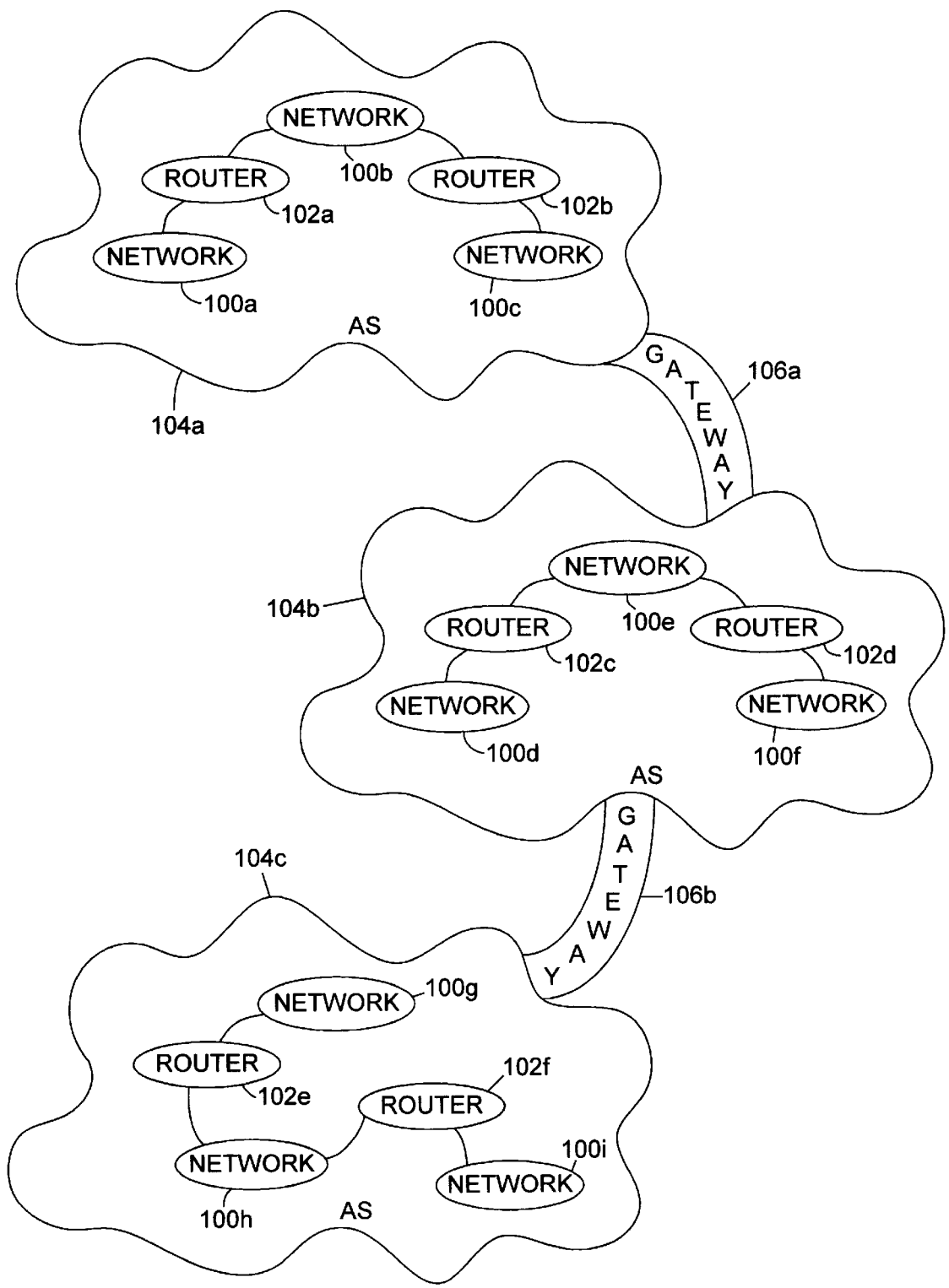
FIG. 1 is a diagram illustrating the basic organization of the Internet.
Figure 2:
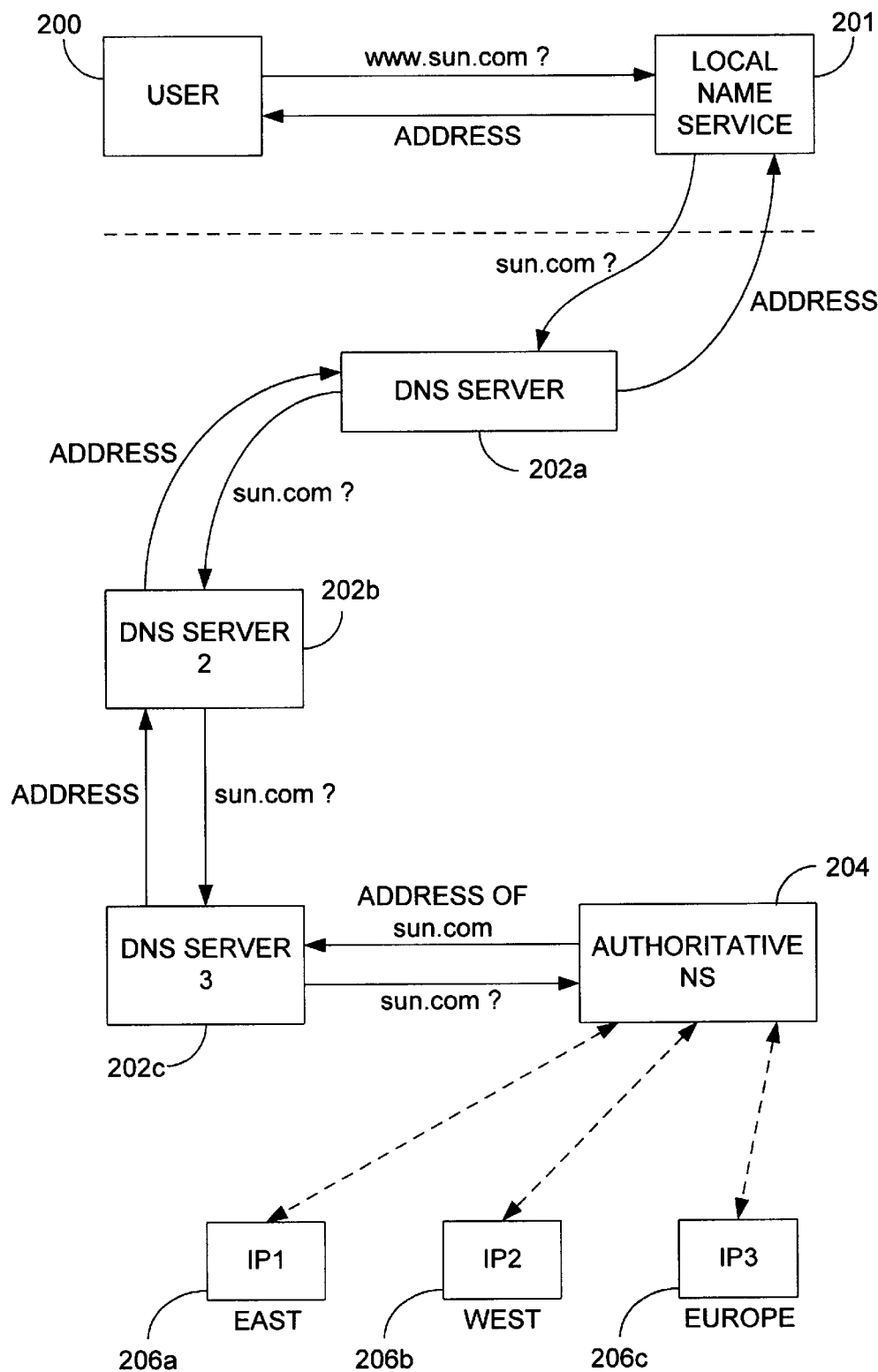
FIG. 2 is a block diagram illustrating a path taken by a user's request for a particular address, and the path taken in receiving that address.
Figure 3:
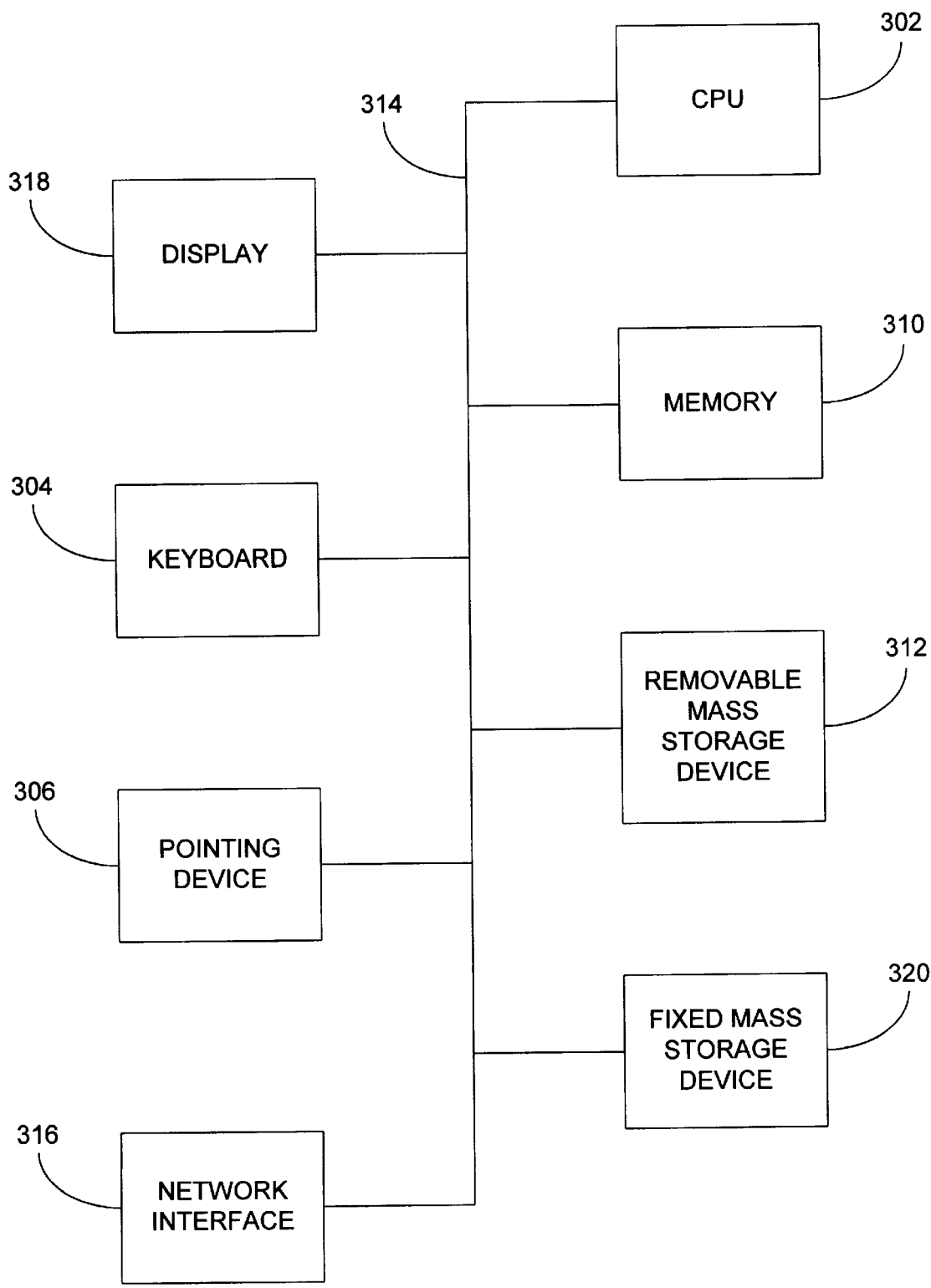
FIG. 3 is a block diagram of a computer system in which an embodiment of the present invention can reside.

FIG. 3 is a block diagram of a general purpose computer system suitable for carrying out the processing in accordance with one embodiment of the present invention. FIG. 3 illustrates one embodiment of a general purpose computer system. Other computer system architectures and configurations can be used for carrying out the processing of the present invention. Computer system, made up of various subsystems described below, includes at least one microprocessor subsystem (also referred to as a central processing unit, or CPU) 302. That is, CPU 302 can be implemented by a single-chip processor or by multiple processors. CPU 302 is a general purpose digital processor which controls the operation of the computer system. Using instructions retrieved from memory 310, the CPU 302 controls the reception and manipulation of input data, and the output and display of data on output devices.

CPU 302 is coupled bi-directionally with memory 310 which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on CPU 302. Also as well known in the art, primary storage typically includes basic operating instructions, program code, data and objects used by the CPU 302 to perform its functions. Primary storage devices 310 may include any suitable computer-readable storage media, described below, depending on whether, for example, data access needs to be bi-directional or uni-directional. CPU 302 can also directly and very rapidly retrieve and store frequently needed data in a cache memory (not shown).

A removable mass storage device 312 provides additional data storage capacity for the computer system, and is coupled either bi-directionally or uni-directionally to CPU 302. For example, a specific removable mass storage device commonly known as a CD-ROM typically passes data uni-directionally to the CPU 302, whereas a floppy disk can pass data bi-directionally to the CPU 302. Storage 312 may also include computer-readable media such as magnetic tape, flash memory, signals embodied on a carrier wave, PC-CARDS, portable mass storage devices, holographic storage devices, and other storage devices. A fixed mass storage 320 can also provide additional data storage capacity. The most common example of mass storage 320 is a hard disk drive. Mass storage 312, 320 generally store additional programming instructions, data, and the like that typically are not in active use by the CPU 302. It will be appreciated that the information retained within mass storage 312, 320 may be incorporated, if needed, in standard fashion as part of primary storage 310 (e.g. RAM) as virtual memory.

In addition to providing CPU 302 access to storage subsystems, bus 314 can be used to provide access other subsystems and devices as well. In the described embodiment, these can include a display monitor 318, a network interface 316, a keyboard 304, and a pointing device 306, as well as an auxiliary input/output device interface, a sound card, speakers, and other subsystems as needed. The pointing device 306 may be a mouse, stylus, track ball, or tablet, and is useful for interacting with a graphical user interface.

The network interface 316 allows CPU 302 to be coupled to another computer, computer network, or telecommunications network using a network connection as shown. Through the network interface 316, it is contemplated that the CPU 302 might receive information, e.g., data objects or program instructions, from another network, or might output information to another network in the course of performing the abovedescribed method steps. Information, often represented as a sequence of instructions to be executed on a CPU, may be received from and outputted to another network, for example, in the form of a computer data signal embodied in a carrier wave. An interface card or similar device and appropriate software implemented by CPU 302 can be used to connect the computer system to an external network and transfer data according to standard protocols. That is, method embodiments of the present invention may execute solely upon CPU 302, or may be performed across a network such as the Internet, intranet networks, or local area networks, in conjunction with a remote CPU that shares a portion of the processing. Additional mass storage devices (not shown) may also be connected to CPU 302 through network interface 316.

An auxiliary I/O device interface (not shown) can be used in conjunction with computer system. The auxiliary I/O device interface can include general and customized interfaces that allow the CPU 302 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, bus 314 is illustrative of any interconnection scheme serving to link the subsystems. The computer system shown in FIG. 3 is but an example of a computer system suitable for use with the invention. Other computer architectures having different configurations of subsystems may also be utilized.

Figure 4:
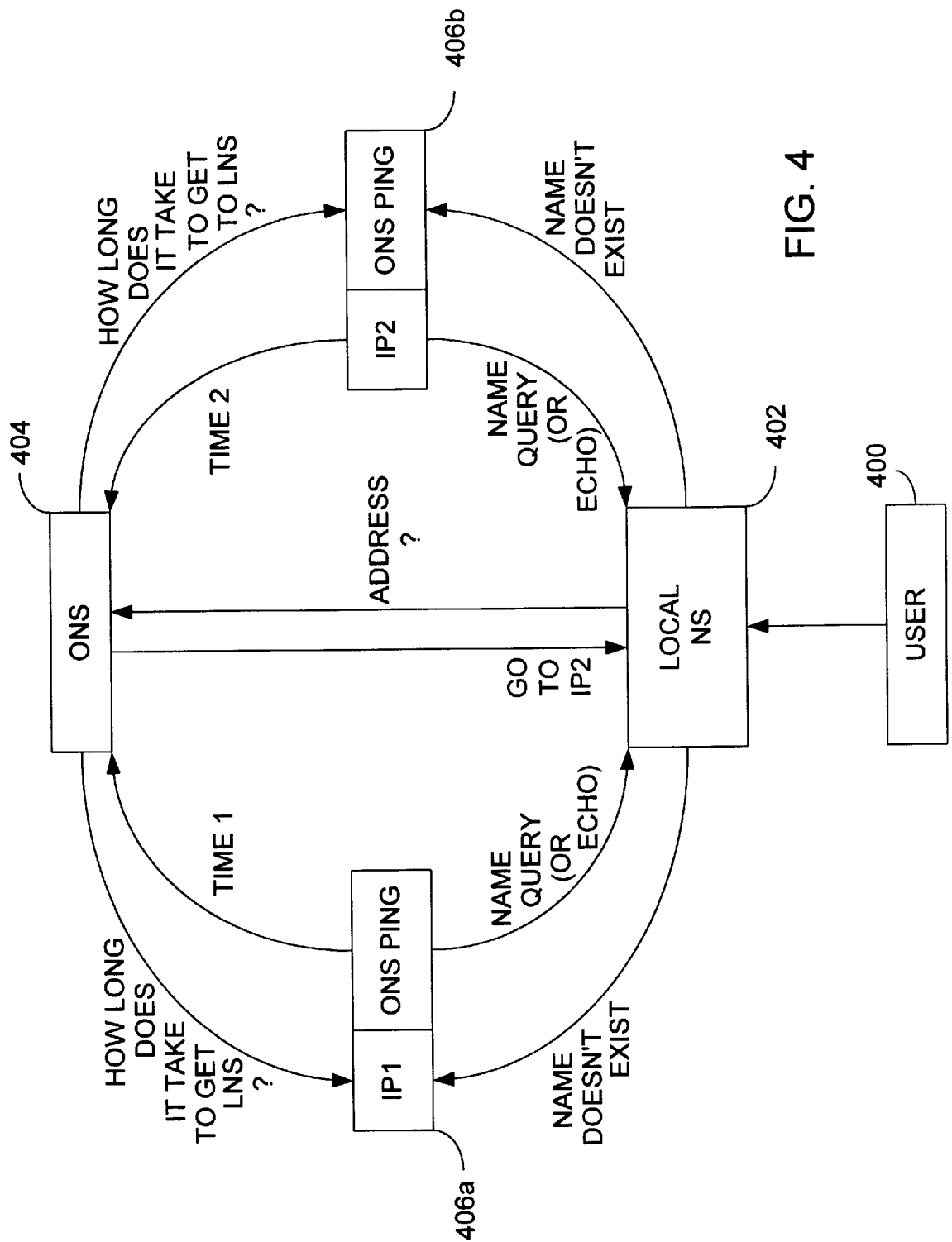
FIG. 4 is a system diagram illustrating the data flow of the system for providing server selection for mirrored sites according to an embodiment of the present invention.

FIG. 4 is a block diagram of a system according to an embodiment of the present invention for providing service selection for mirrored sites. FIG. 4 also shows the data flow between components. A user 400 sends a request for an address to the user's local name service 402. The local name service 402 then requests the address from an Optimizer Name Server (ONS) 404. The request from the local name server (local NS) 402 may route through several servers prior to reaching the ONS 404.

The ONS 404 is preferably a name server which can specifically answer queries, such as name queries. Although the ONS can work with more than one name, it is limited to approximately two or three names. Alternatively, the name server 404 can be a conventional ANS. Accordingly, a conventional ANS can be used either in addition to a ONS or in place of a ONS to handle a greater number of names. The ONS and the mirrored servers are preferably implemented in JAVA™. Further details of the functions of the ONS will be described in conjunction with FIGS. 5, 6, and 7.

Figure 5:
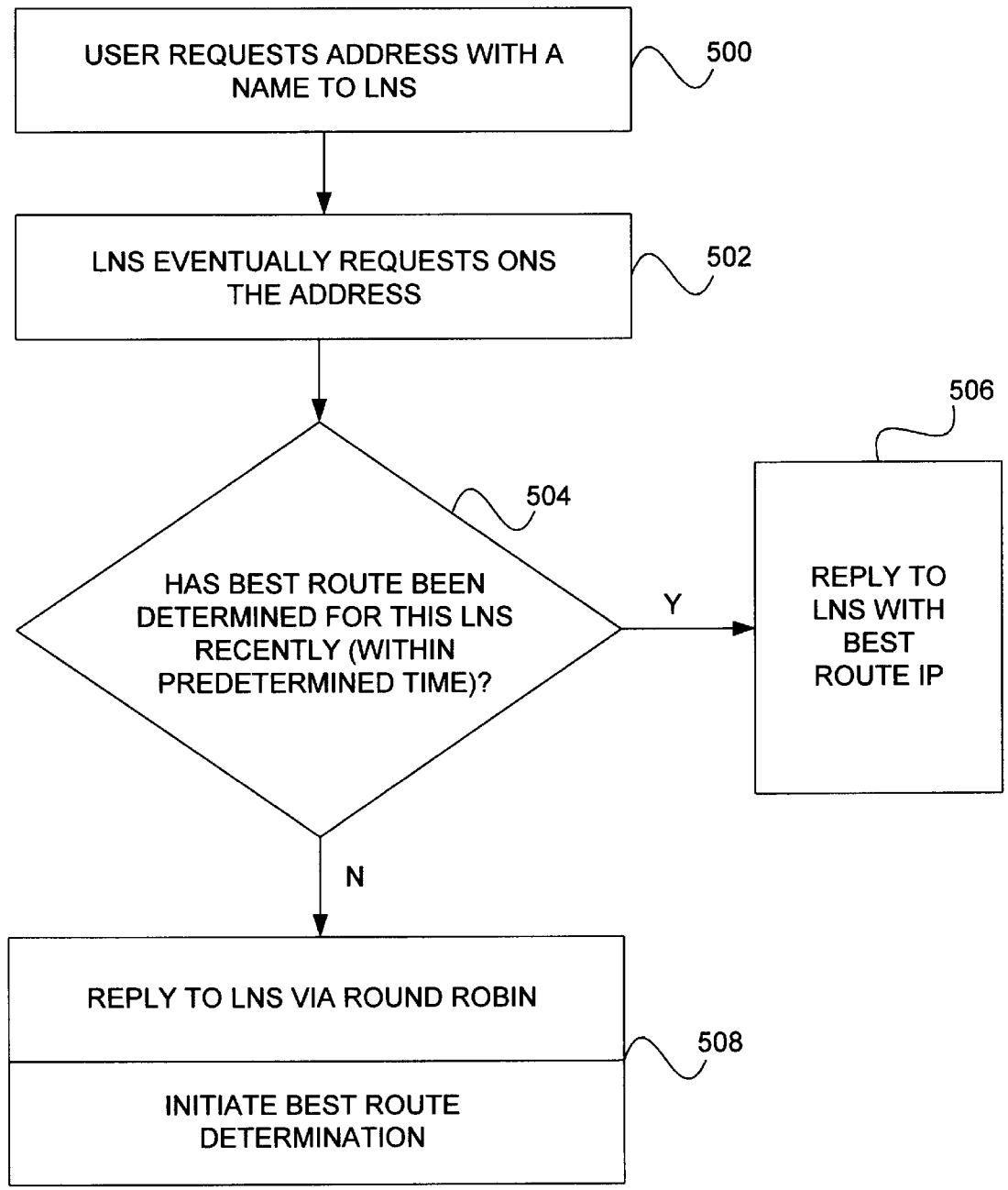
FIG. 5 is a flow diagram of a method according to an embodiment of the present invention for providing server selection for mirrored sites.
Figure 6:
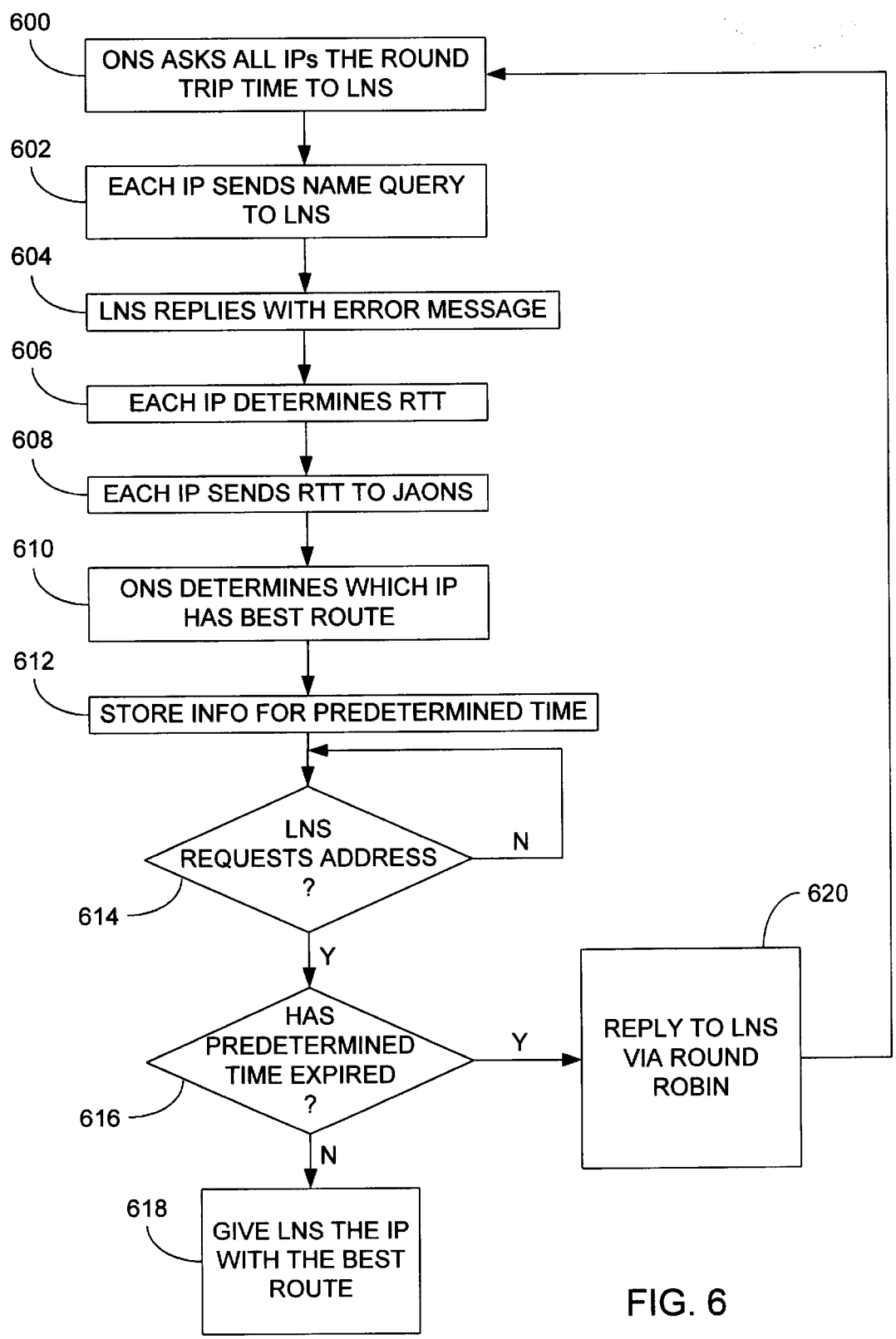
FIG. 6 is a flow diagram of a method according to an embodiment of the present invention for determination of best route as recited in step 508 of FIG. 5.
Figure 7:
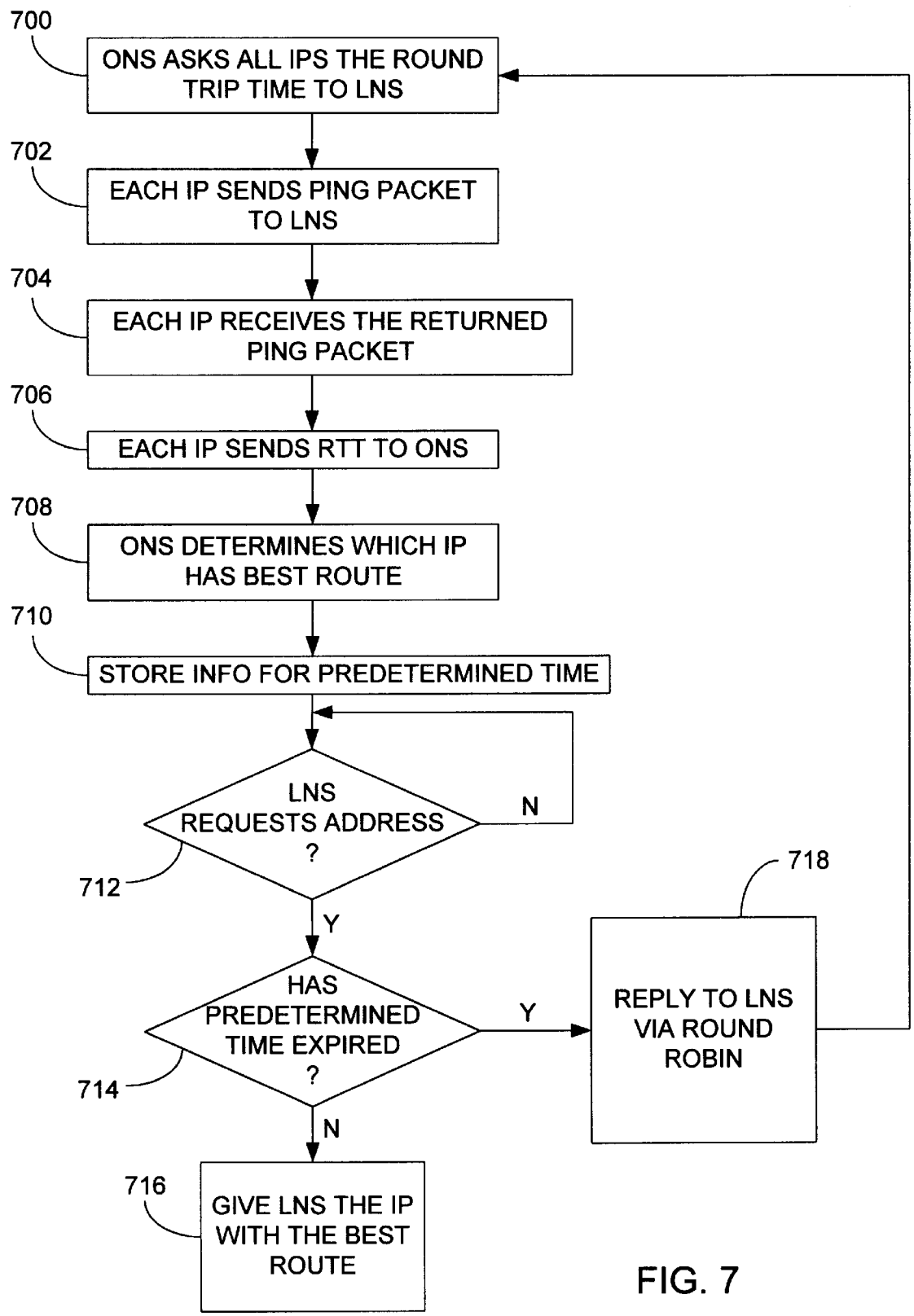
FIG. 7 is an alternative method according to an embodiment of the present invention for determination of best route recited in step 508 of FIG. 5.

The data flow shown in FIG. 4 can best be understood when referred to in conjunction with FIGS. 5, 6, and 7. FIG. 5 is a flow diagram of a method according to an embodiment of the present invention for server selection for mirrored sites. FIG. 6 is a flow diagram of a method for best route determination of step 508 in FIG. 5. FIG. 7 is an alternative method for the best route determination of step 508 in FIG. 5.

The method according to the present invention for providing service selection for mirrored sites can be seen in the examples shown in FIGS. 4 and 5. The user 400 requests an address with a name to the local NS (LNS) 402 in step 500. The LNS eventually contacts and requests the address from the ONS 404 via step 502. It is then determined by the ONS if a best route has already been determined for this LNS which is still valid via step 504. A best route determination is preferably only valid for a predetermined time, such as thirty minutes. If a best route has been determined for this LNS which is still within the predetermined time, then the ONS 404 replies to the LNS 402 with the best route mirrored server via step 506.

If, however, the best route has not been determined for this LNS, or the predetermined time has expired, then the ONS 404 replies to LNS 402 via a selection scheme, such as a round robin scheme, via step 508. Additionally, if a best route has not been determined for this LNS, a best route determination for the LNS is initiated with step 508.

A preferred method according to an embodiment of the present invention of best route determination (step 508 of FIG. 5) can be described in connection with references to FIGS. 4 and 6. In initiating best route determination, the ONS 404 requests from all the mirrored servers 406a–406b the round trip time to the LNS 402 via step 600. Each mirrored server 406a–406b then sends a name query to the LNS 402 via step 602. The LNS 402 then replies with an error message stating that the requested name does not exist via step 604. Each mirrored server 406a–406b then determines the round trip time from the time the name query was sent to the time the error message was received via step 606. Each mirrored server 406a and 406b then sends its round trip time to the ONS 404 via step 608. The ONS 404 can then determine which mirrored server has the best route for this particular LNS 402 via step 610. The best route is equivalent to the fastest route. The best route is then stored for a predetermined time via step 612.

When the LNS 402 requests an address via step 614, it is determined whether the pre determined time has expired in step 616. If so, then the ONS 404 replies to the LNS 402 via a selection scheme, such as a round robin scheme, via step 620 and a best route determination is initiated via step 600. If, however, the predetermined time has not expired via step 616, then the LNS 402 is assigned to the mirrored server 406 with the best route via step 618.

An alternative method according to an embodiment of the present invention for the best route determination (step 508 of FIG. 5) can be described in conjunction with FIGS. 4 and 7. The ONS 404 requests from all the mirrored servers 406a–406b the round trip time to the LNS 402 via step 700. Each mirrored server 406a–406b then sends an echo packet to LNS 402 via step 702. An echo packet is an Internet Control Method Protocal (ICMP) packet which is returned by the receiver when the receiver receives the echo packet. Echo packets are commonly known in the industry. Each mirrored server 406a–406b then receives a return echo packet from the LNS 402 via step 704. Each mirrored server 406a–406b then determines a round trip time and sends the round trip time to the ONS 404 via step 706. The remaining step 708–718 are the same as steps 610–620 of FIG. 6.

A method and system for providing server selection for mirrored sites has been disclosed. Software written according to the present invention may be stored in some form of computer readable medium such as memory or CD-ROM or transmitted over a network, and executed by a processor.

Although the present invention has been described in accordance with the embodiments shown, one of ordinary skill in the art will readily recognize that there could be variations to the embodiment and these variations would be within the spirit and scope of the present invention. Accordingly, many modifications may be made by one of ordinary skill in the art without departing from the spirit and scope of the appended claims.

What is claimed is:

1. A method for computer server selection in a computer network including a plurality of servers, the method comprising:

determining whether a best route has been determined;

determining if a predetermined time has expired after the best route has been determined, and either;

selecting one of the plurality of servers as a best route server if the best route has been determined and the predetermined time has not expired; or selecting one of the plurality of servers as a selection scheme server if the best route has not been determined or if the predetermined time has expired, the selection of the selection scheme server being determined via a selection scheme, wherein the selection scheme does not include determining the best route.

2. The method of claim 1, wherein the selection scheme is a round robin scheme.

3. The method of claim 1, further including a step of determining the best route if the best route has not been determined.

4. The method of claim 3, wherein the determination of best route includes determining a round trip time from one of the plurality of servers to a local name server.

5. The method of claim 4, wherein the determination of the round trip time includes a step of sending a name query to the local name server.

6. The method of claim 5, wherein the determination of the round trip time includes a step of receiving an error message from the local name server.

7. The method of claim 4, wherein the determination of the round trip time includes a step of sending an echo packet to the local name server.

8. The method of claim 7, wherein the determination of the round trip time includes a step of receiving a returning echo packet from the local name server.

9. The method of claim 1, wherein the determination of best route includes determining a first round trip time from a first one of the plurality of servers to a local name server and a second round trip time from a second one of the plurality of servers to the local name server.

10. The method of claim 9, wherein the first round trip time and the second round trip time is compared to determine which one of the first and second servers has the best route.

11. The method of claim 1, wherein the best route includes a shortest round trip time between one of the plurality of servers and a local name server.

12. A system for computer server selection in a computer network including a plurality of servers, the system comprising:

means for determining whether a best route has been determined;

means for determining if a predetermined time has expired after the best route has been determined;

means for selecting one of the plurality of servers as a best route server if the best route has been determined and the predetermined time has not expired; and means for selecting one of the plurality of servers as a selection scheme server if the best route has not been determined or if the predetermined time has expired, the selection of the selection scheme server being determined via a selection scheme, wherein the selection scheme does not include determining the best route.

13. A system for computer server selection in a computer network, the system comprising:

a plurality of servers; and an authoritative name server coupled to the plurality of servers, wherein the authoritative name server determines whether a best route has been determined, and selects one of the plurality of servers as a best route server if the best route has been determined and if a predetermined time has expired after the best route has been determined; or selects one of the plurality of servers as a selection scheme server, if the best route has not been determined or if the predetermined time has expired, wherein the selection scheme does not include determining the best route.

14. A computer program product for computer server selection in a computer network including a plurality of servers, comprising:

computer code determining whether a best route has been determined;

computer code determining if a predetermined time has expired after the best route has been determined; and either:

computer code selecting one of the plurality of servers as a best route server if the best route has been determined and the predetermined time has not expired;

computer code selecting one of the plurality of servers as a selection scheme server if the best route has not been determined or if the predetermined time has expired, the selection of the selection scheme server being determined via a selection scheme, wherein the selection scheme does not include determining the best route; and a computer readable medium that stores the computer codes.

15. The computer program product of claim 14, wherein the computer readable medium is selected from the group consisting of CD-ROM, floppy disk, tape, flash memory, system memory, hard drive, and data signal embodied in a carrier wave.

16. A method comprising the steps of:

receiving a request of service for one of a plurality of servers any which of one can process the request;

determining if a best route to a best server among the plurality of servers has previously been defined; and either:

determining if the best route is valid by determining if a predetermined time period has lapsed since the best server was defined; and routing the request to the best server if the best rout is valid; or selecting one of the plurality of servers to process the request using a selection scheme if either the best server has not been previously defined or if the predetermined time period has lapsed, the selection scheme not using a best route determining scheme in selecting the selected server.

* * * * *